US009836725B2

(12) United States Patent
Cohen

(10) Patent No.: US 9,836,725 B2
(45) Date of Patent: Dec. 5, 2017

(54) DETERMINING TRANSPORTATION STATUS USING NETWORK CONNECTIONS

(71) Applicant: Google Inc., Mountain View, CA (US)

(72) Inventor: Tal Cohen, Atlit (IL)

(73) Assignee: GOOGLE LLC, Mountain View, CA (US)

( * ) Notice: Subject to any disclaimer, the term of this patent is extended or adjusted under 35 U.S.C. 154(b) by 97 days.

(21) Appl. No.: 14/505,312

(22) Filed: Oct. 2, 2014

(65) Prior Publication Data

US 2015/0149087 A1    May 28, 2015

(30) Foreign Application Priority Data

Nov. 28, 2013   (IL) .......................................... 229671

(51) Int. Cl.
G06Q 50/30   (2012.01)
G06Q 10/10   (2012.01)

(52) U.S. Cl.
CPC ........... G06Q 10/109 (2013.01); G06Q 50/30 (2013.01)

(58) Field of Classification Search
CPC .............................. G06Q 10/109; G06Q 50/30
USPC ......................................................... 701/522
See application file for complete search history.

(56) References Cited

U.S. PATENT DOCUMENTS

| 7,469,827 B2 | 12/2008 | Katragadda et al. |
| 8,965,353 B2 * | 2/2015 | Bruins .................. H04W 4/001 455/418 |
| 2011/0130948 A1 * | 6/2011 | Oh ......................... G08G 5/003 701/120 |
| 2012/0010806 A1 * | 1/2012 | Tseng ..................... G01C 21/00 701/528 |

(Continued)

FOREIGN PATENT DOCUMENTS

WO   WO2013-090515   6/2013

OTHER PUBLICATIONS

Anonymous. *Location-aware checkin, seat assignment, rebooking and secure, authorized notification of passenger transfer and pickup.* IP.Com. Published Jul. 23, 2012. 4 pages.

(Continued)

*Primary Examiner* — Redhwan K Mawari
*Assistant Examiner* — Anshul Sood
(74) *Attorney, Agent, or Firm* — Johnson, Marcou & Isaacs, LLC

(57) ABSTRACT

Methods, systems, and apparatus, including computer programs encoded on computer storage media, for determining travel information. One of the methods includes obtaining flight information for each of a plurality of users, the flight having a flight identifier and associated with a particular scheduled departure time and departure location; based on the scheduled departure time, obtaining location information for user devices associated with each user of the plurality of users; determining that the respective user devices associ- (Continued)

ated with a first group of users of the plurality of users, has a location associated with the departure location; determining that the respective mobile devices associated with users of the first group are no longer in communication a mobile network; and using the respective times at which the user devices are determined to no longer be in communication with the mobile network along with the scheduled departure time to determine a departure time.

18 Claims, 2 Drawing Sheets

(56) References Cited

U.S. PATENT DOCUMENTS

2013/0041941 A1    2/2013    Tomasic et al.

OTHER PUBLICATIONS

Barbera, M. et al. *Signals from the crowd: Uncovering Social Relationships through Smartphone Probes.* IMC '13 Proceedings of the 2013 Conference on Internet Measurement Conference. Published Oct. 2013. 12 pages.

\* cited by examiner

DETERMINING TRANSPORTATION STATUS USING NETWORK CONNECTIONS

CROSS-REFERENCE TO RELATED APPLICATIONS

This application claims priority under 35 U.S.C. §119 to Israel patent application 229671 filed on Nov. 28, 2013, which is incorporated here by reference.

BACKGROUND

This specification relates to travel data.

Individuals often want to know whether particular travel modes, e.g., flights, trains, busses, have departed or arrived. For example, whether a flight has departed from a departure airport or arrived at a destination airport, and what time each occurred. Conventional resources for determining flight departure/arrival information typically rely on information provided by airports or airline companies. This data can be time delayed or incomplete.

SUMMARY

In general, one innovative aspect of the subject matter described in this specification can be embodied in methods that include the actions of obtaining flight information for each of a plurality of users, wherein each user of the plurality of users is associated with a particular flight, the flight having a flight identifier and associated with a particular scheduled departure time and departure location; based on the scheduled departure time, obtaining location information for user devices associated with each user of the plurality of users; determining that the respective user devices associated with a first group of users of the plurality of users, has a location associated with the departure location; determining that the respective mobile devices associated with users of the first group of users having a location associated with the departure location are no longer in communication a mobile network; and using the respective times at which the user devices are determined to no longer be in communication with the mobile network along with the scheduled departure time to determine a departure time for the particular flight. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. The flight identifier is a flight number, the departure time includes a particular date and time, and the departure location identifies a particular airport. Determining that a user device is no longer in communication with the mobile network indicates the user device has been deactivated. Using the respective times at which the user devices are determined to no longer be in communication with the mobile network along with the scheduled departure time to determine a departure time for the particular flight includes using the time at which the last user device became no longer in communication with the mobile network as the departure time for the flight. Using the respective times at which the user devices are determined to no longer be in communication with the mobile network along with the scheduled departure time to determine a departure time for the particular flight includes determining that a specified percentage of the user devices are no longer in communication with the mobile network. Using the respective times at which the user devices are determined to no longer be in communication with the mobile network along with the scheduled departure time to determine a departure time for the particular flight includes determining that less than a specified number of the user devices in the first group of users are in communication with the mobile network. The method further includes using the determined departure time to provide flight status information in response to a received query. The method further includes determining that one or more of the mobile devices have rejoined the mobile network at a location corresponding to a scheduled destination location of the flight; and determining a flight arrival time based on the time at which the first mobile device has rejoined the mobile network at the destination location. The method further includes using the determined flight arrival time to provide flight status information in response to a received query. The method further includes determining that one or more devices associated with the users of the first group of users have joined an in-flight wireless network and using the determination to refine the departure time for the flight.

Particular embodiments of the subject matter described in this specification can be implemented so as to realize one or more of the following advantages. Flight status information regarding departure and arrival times can be determined with a high degree of accuracy. Using data from a group of users having a same flight schedule can further improve the accuracy of the determined departure and arrival times. Emergency landing or other unintended arrivals can be determined when users rejoin a mobile network at an earlier than expected time or at a location that does not correspond to the scheduled destination for a flight. The determined flight departure and arrival time can be used for airports or airlines where there is a lack of conventional information about flight departures and arrivals. In particular, the determined flight departure and arrival time is independent of airline or airport information systems.

Flight departure and arrival data can be aggregated over time. The aggregated data can be used to discover one or more of delay patterns for specific flights, delay patterns in airports, delay patterns of specific airlines, or to detect and monitor inaccuracies in other data sources allowing the accuracy of various sources to be estimated. Additionally, flight departure and arrival data is more likely to be obtained for flights that are of greater importance to the users since there is likely to be more user travel information available for those flights.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Travel information is obtained for a collection of users. The travel information is used with location data and network access data associated with one or more users of the collection of users to determine departure and/or arrival times for particular transportation schedules associated with the user travel information.

For example, the travel information obtained for one or more users can be flight information that identifies a particular flight on a particular date. The flight can be identified, for example, by one or more of flight number, departure location and time, and arrival time.

The flight information can be obtained from various sources. For example, the flight information can be obtained from e-mails containing flight confirmation or itinerary information. Alternatively, the flight information can be obtained from a user calendar entry for the flight. For users of the collection of users having a particular flight and having a particular location corresponding to the departure location, a time at which those users are no longer in communication with a mobile network is monitored and used as a flight departure indicator. Additionally, or alternatively, the time at which the users are determined to have switched to a known on-aircraft network, e.g., on board WiFi, can be used as a flight departure indicator.

The user location can be determined based on, for example, a location of a user device, e.g., a mobile phone, associated with the user. For those same users, a time at which one or more of the users are again in communication with the mobile network and located at the destination location of the flight is monitored and used as a flight arrival indicator. The indicators for multiple users can be combined to estimate one or more of the departure time and arrival time for the flight.

Figure 1:
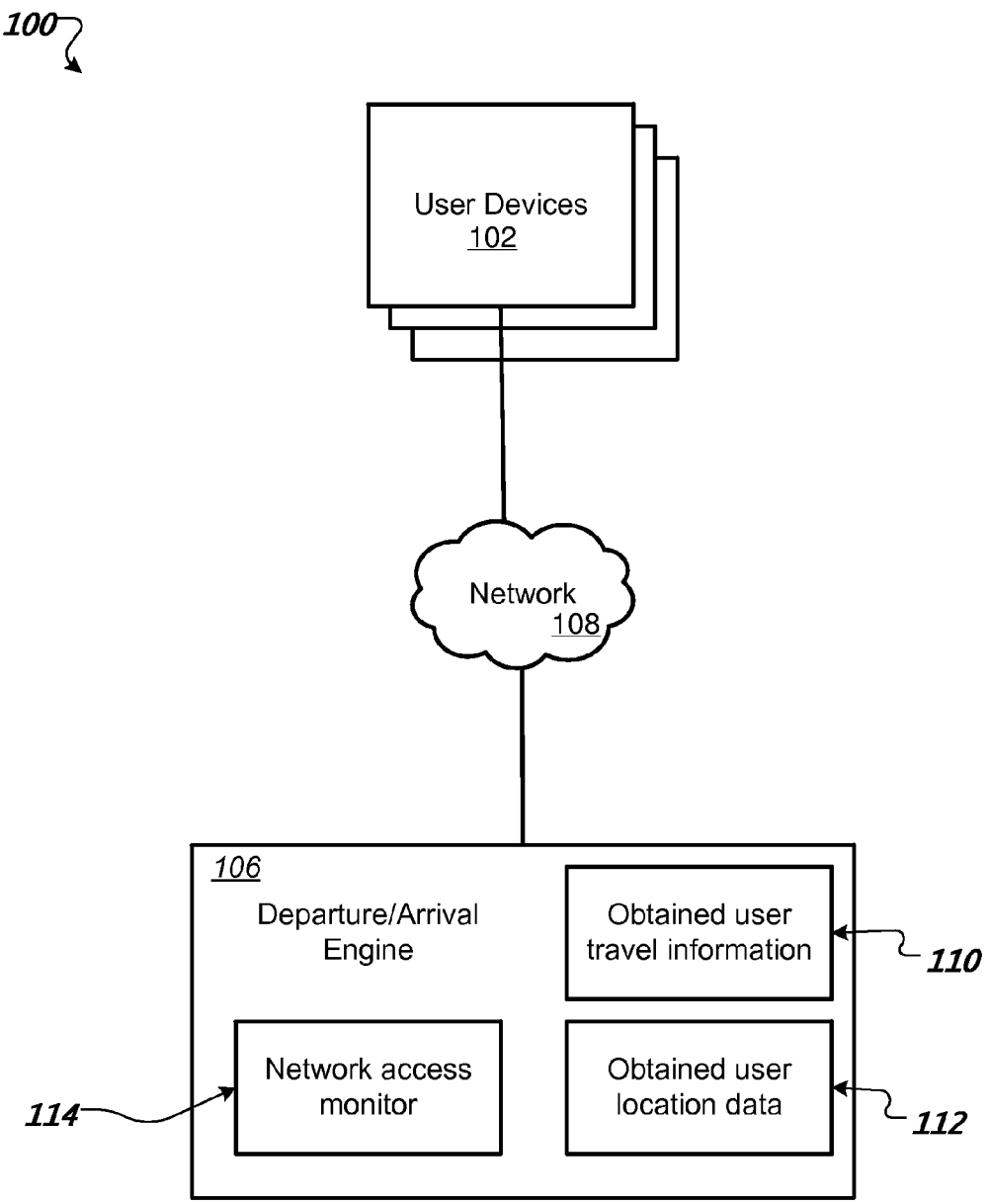
FIG. 1 shows a block diagram of an example system for determining transportation departure and arrival information.

FIG. 1 shows a block diagram of an example system 100 for determining transportation departure and arrival information. The system 100 includes user devices 102, and a departure/arrival engine 106 coupled by a network 104 (e.g., a user device can be a mobile phone coupled to the Internet through one or more cellular or wi-fi networks).

The user devices 102 can include various types of mobile devices, for example, mobile phones, tablet devices, laptops, etc. Location data can be determined for each user device 102. In some implementations, the location data is determined using global positioning system (GPS) data using GPS receivers embedded in user devices. Alternatively, antenna signal strength can be used to estimate mobile device location, e.g., using cellular or wi-fi signals. In some other implementations, location of the user device can be determined based on network information, e.g., based on what network the user device is in communication with and the network infrastructure.

In some implementations, individual users can set preferences for their respective mobile devices to allow or disallow location data to be determined. Alternatively, the users can allow location data to be determined for particular purposes or to particular parties.

The user devices 102 can provide network access, e.g., to network 108 or another network. The networks can be used to provide voice, text, and internet access. For example, the user device can be a mobile phone that accesses a network, e.g., using EDGE, GSM, UMTS, HSDPA, or HSUPA networks, according to particular wireless network protocols, e.g., 2G/3G/4G. The user device can also access a network using Wi-Fi when available. Applications executed on the user devices can be used to access various network content and/or services.

The departure/arrival system 106 can be used to determine when departures and arrivals for particular transportation modes have occurred. The transporting mode can include flights, trains, busses, or other forms of transportation. For clarity of discussion, determining flight departure and arrival time will be used as an example throughout this specification.

The departure/arrival system 106 includes obtained user travel information 110, obtained user location data 112, and a network access monitor 114. The obtained user travel information 110, obtained user location data 112 and network access monitor 114 are used to determine when a flight associated with one or more users has departed and from a departure location and, optionally, when the flight has arrived at an arrival location.

The obtained user travel information 110 includes travel information obtained from each user of a collection of users. The travel information can be obtained from users directly or from a source that has aggregated user travel information. Additionally, the travel information can be extracted from user data. For example, the travel information can be extracted form user e-mails, e.g., flight confirmation e-mails, calendar entries indicating flights and times, or orders from a travel services provider. In some alternative implementations, users having an account with the system provide flight information directly or in response to a query from the system.

The travel information can include details on the particular mode of travel, a departure date and location, and an arrival date and location. The departure and arrival dates can include both a calendar date and a scheduled time. For example, if the travel information is flight information, the flight information can include a flight number, departure date and airport, and arrival date and airport. Thus, for a user traveling from San Francisco to Los Angeles the flight information can include a flight number, e.g., Example Airlines Flight 123, a departure date and location, e.g., Oct. 31, 2013 at 7:45 am from San Francisco International Airport (SFO), and an arrival date and location, e.g., Oct. 31, 2013 at 8:40 am at Los Angeles International Airport (LAX).

The obtained travel information 110 for a collection of users can be processed to identify users sharing a common travel schedule. For example, a group of users from the collection of users that are all planning to be on the same flight from SFO to LAX. Another group of users can be identified as traveling from SFO to JFK in New York on the same flight. Each group of users having a common travel schedule can be used by the departure/arrival system 106 to determine actual departure and arrival times.

The obtained user location data 112 corresponds to the location of one or more of the user devices 102 associated with particular users of the collection of users. The location can be determined for each user device as described above, e.g., using GPS data. The obtained location data for particular user devices can be used to determine whether or not a departure and/or an arrival has occurred and at what time the departure and/or arrival occurred. In particular, the location data can be used to determine if the associated user is at the departure location or at the arrival location. For example, for a flight the departure location can be an airport in a first city and the arrival location can be an airport in a second city.

In some implementations, location data is obtained for a particular user device only within a range of time associated with the corresponding travel information. For example, for a user having a flight scheduled to depart at 7:45 am on Oct. 31, 2013 from SFO, the location data of the user's device can be obtained beginning a specified amount of time prior to the 7:45 am scheduled departure time, e.g., beginning one hour or two hours prior. Location data can be obtained until a determination has been made that the arrival has occurred or that the user did not take the schedule transportation, e.g., the user missed the flight. Thus, a given user need not choose to provide location data at all times, but instead only near scheduled transportation events.

The network access monitor 114 determines whether one or more particular user devices are in communication with one or more networks. Mobile devices typically poll remote services periodically. For example, periodically checking e-mail for new mail. The mail application can poll a mail server, for example, at a default rate for the mail application or at a rate specified by the user of the device, e.g., once every three minutes or once every 15 seconds. If the periodic polling stops, it is an indication that the user device is no longer in communication with the one or more networks. This can indicate, for example, that the user has shut off their user device for a flight takeoff. Similarly, when the periodic polling resumes it may be an indication that the user has arrived. In particular, when the periodic polling is performed from a new geographic location it can indicate an arrival. When the geographic location corresponds to the destination location of the flight, it provides an indication that the flight has arrived. The geographic location of a given user device can be derived from different sources, for example, a source internet protocol (IP) address or GPS information for the device.

The network access monitor 114 can obtain data for one or more of the user devices 102 indicating whether or not the user device is in communication with a network. The network access monitor 114 can obtain the data form one or more associated services that can be polled, e.g., mail servers, social networks. As with the location data, this monitoring can occur in relation to the specific transportation information of the users 102 to limit the monitoring to a relevant time frame.

Figure 2:
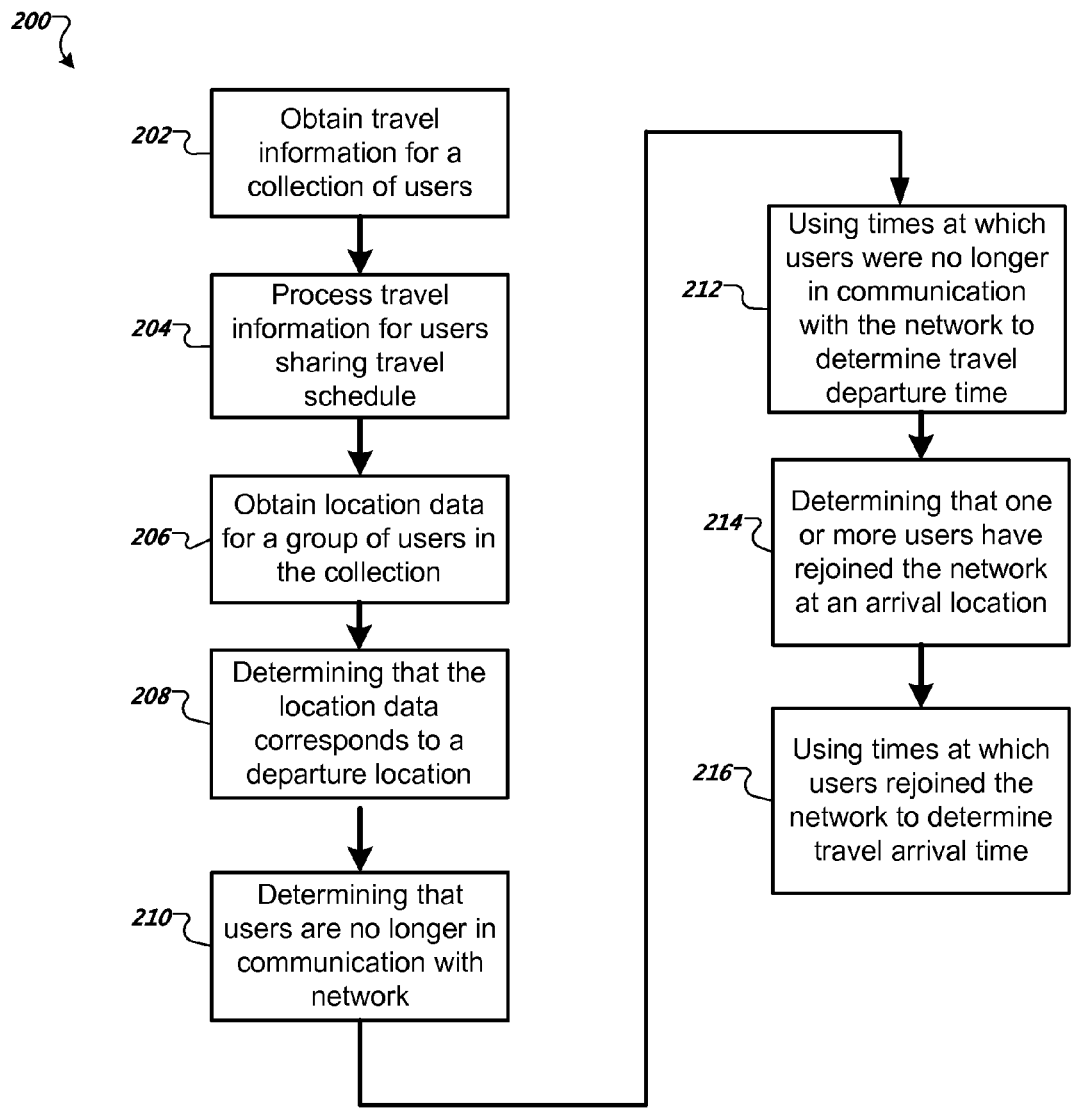
FIG. 2 shows a flow diagram of an example method for determining transportation departure and arrival information.

FIG. 2 shows a flow diagram of an example method 200 for determining transportation departure and arrival information. For convenience, the method 200 will be described with respect to a system that performs the method, for example the departure arrival system 106 of FIG. 1.

The system obtains travel information for a collection of users (202). The travel information can be obtained and/or extracted from the respective users individually or through an aggregator as described above.

The system processes the obtained travel information to determine one or more groups of users that share a common travel schedule (204). For example, if ten users of the group of users are on a same flight from SFO to JFK, they can be assigned to a first group.

The system obtains location data for one or more groups of users having an upcoming transportation schedule (206). For example, location data can be obtained for user devices associated with groups of users having respective flights scheduled to depart within a specified time range, e.g., users of groups having flights departing within two hours. Thus, at various times the system can obtain location data and continue with the process for determining departure and arrival times for travel schedules associated with the corresponding groups.

The system uses the obtained location data to determine whether each user's location data corresponds to the departure location of the corresponding user's travel information (208). For example, for a group of users having a flight departing from SFO, the system determines whether the location data associated with each user corresponds to the San Francisco International Airport. The system can periodically update the location data to update the determination. In particular, a user that is not located at the departure location near the scheduled departure time, e.g., 10 minutes before scheduled departure, may indicate that the user is not taking the flight. Data for these users can be discarded in determining departure and arrival times for the flight.

The system determines that one or more user devices are no longer in communication with a mobile network (210). In particular, for a group of users determined to have a location corresponding to the departure location, the system monitors the network access of the corresponding user devices. For flights, users are required to deactivate user devices shortly before departure. Thus, when users of the group of users taking a particular flight are no longer in communication with a network, it is an indication that the flight departure is imminent. Additionally, or alternatively, the time at which the users are determined to have switched to a known on-aircraft network, e.g., on board WiFi, can be used as a flight departure indicator.

The system uses the times at which the user devices are no longer in communication with the network to determine departure time (212). In some implementations, the time at which the last user of the group is determined to no longer be in communication with the mobile network is considered to be the departure time for the flight. However, this can be an outlier that may not always be accurate, e.g., when a user just misses a flight they may not turn off their user device or may only turn the user device off when preparing to depart on a substitute flight.

Alternatively, the departure time can be determined based on a time at which a specified percentage of users in the group located at the departure location are no longer in communication with the network. For example, when 75% of the users in the group at the departure location are no longer in communication with the network, the flight can be considered departed.

In another alternative, instead of a percentage of users a "less than X" criterion can be used. If less than X number of users in the group located at the departure location are still in communication with the network, while all other users in the group are no longer in communication with the network, the flight can be considered departed. For example, if X=3, if less than three user devices associated with the group and located at the departure location are still in communication with the network, the flight is considered departed. One benefit of the "less than X" criterion as compared to the percentage criterion is that the value of X does not depend on the number of user in the group.

The system optionally determines that one or more users devices associated with the group of users are again in communication with the network at a location corresponding to the arrival location (214). In particular, when even a single user device resumes polling one or more particular services, the network access monitor of the system can determine that the particular user device is again in communication with the network. Additionally, the system obtains location data for the device to determine whether the user device is located at the scheduled arrival location. This accounts for the possibility, for example, that the user device was out of communication with the network for a period of time without the user being on the flight. Furthermore, an emergency landing or other unintended arrival can be determined when users rejoin the network at an earlier than expected time or at a location that does not correspond to the scheduled destination for a flight.

The system uses times at which users are again in communication with the network at the arrival location to determine arrival time (216). In some implementations, the time at which a first user device associated with a user of the group that is again in communication with the network, and that also is determined to have a location at the destination location, is considered the arrival time.

The system uses the determined departure and/or arrival times. In particular, the departure and/or arrival times can be used to respond to flight status queries. For example, an individual can input a flight status query into a search engine. The search engine can use the determined departure and/or arrival information to provide the requesting individual with information about the flight in response to the query. The departure and/or arrival times can also be used to analyze transportation data, for example, to perform statistical analysis on the reliability of schedule information for particular transportation modes, carriers, airlines, airports, etc.

In some implementations, specific user identifying information is removed or anonymized. Additionally, having a group of users associated with a particular transportation schedule further protects individual privacy by removing identifying information so that is it unknown what specific individual corresponds to a particular user in the group.

In some implementations, the obtained travel information from user data only corresponds to particular flight numbers and dates. The system can obtain third party scheduling information, e.g., flight schedules. The scheduling information is matched to the obtained travel information in order to determine the complete travel information for each user.

In some implementations, a secondary indicator is used to confirm the determination that a flight has departed. In particular, many flights provide wireless network access after takeoff User devices can be identified as being on the airplane flight network because wireless networks are identified as a flight network in a wi-fi network-to-name database. Thus, if the system has determined that the flight has departed and within a specified time one or more users in the group of users associated with the flight has connected to the flight network, it is an indicator that the earlier flight departure determination was accurate.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method to provide flight status information, comprising:
   obtaining flight information for each of a plurality of users, wherein each user of the plurality of users is associated with a particular flight, the flight having a flight identifier and associated with a particular scheduled departure time and departure location;
   based on the scheduled departure time, obtaining location information for user computing devices associated with each user of the plurality of users;
   determining that the respective user computing devices associated with a first group of users of the plurality of users have a location associated with the departure location;
   determining that at least a threshold percentage of the respective user computing devices associated with users of the first group of users having a location associated with the departure location are no longer in communication with a mobile network, the threshold percentage being less than one hundred percent;
   determining a disconnection time at which a last user computing device of the at least the threshold percentage of the respective user computing devices is no longer in communication with the mobile network;
   designating the disconnection time as a departure time for the particular flight; and
   in response to a received query, providing flight status information based on the determined departure time comprising the disconnection time.

2. The method of claim 1, wherein the flight identifier is a flight number, the departure time comprises a particular date and time, and the departure location identifies a particular airport.

3. The method of claim 1, wherein determining that a user computing device is no longer in communication with the mobile network indicates that the user computing device has been deactivated.

4. The method of claim 1, wherein the threshold percentage comprises seventy-five percent.

5. The method of claim 1, further comprising:
   determining that one or more of the user computing devices have rejoined the mobile network at a location corresponding to a scheduled destination location of the flight; and
   determining a flight arrival time based on the time at which a first user computing device has rejoined the mobile network at the destination location.

6. A system, comprising:
   one or more computing devices configured to perform operations comprising:

obtaining flight information for each of a plurality of users, wherein each user of the plurality of users is associated with a particular flight, the flight having a flight identifier and associated with a particular scheduled departure time and departure location;

based on the scheduled departure time, obtaining location information for user computing devices associated with each user of the plurality of users;

determining that the respective user computing devices associated with a first group of users of the plurality of users have a location associated with the departure location;

determining that at least a threshold percentage of the respective user computing devices associated with users of the first group of users having a location associated with the departure location are no longer in communication a mobile network, the threshold percentage being less than one hundred percent; and using the respective times at which the user computing devices are determined no longer to be in communication with the mobile network to designate a departure time for the particular flight.

7. The system of claim 6, wherein the flight identifier is a flight number, the departure time includes a particular date and time, and the departure location identifies a particular airport.

8. The system of claim 6, wherein determining that a user computing device is no longer in communication with the mobile network indicates that the user computing device has been deactivated.

9. The system of claim 6, wherein using the respective times at which the user computing devices are determined no longer to be in communication with the mobile network to determine a departure time for the particular flight comprises using the time at which a last user computing device of the at least a threshold percentage of the respective user computing devices associated with users of the first group of users having a location associated with the departure location that is no longer in communication with the mobile network became no longer in communication with the mobile network as the departure time for the flight.

10. The system of claim 6, wherein the threshold percentage comprises seventy-five percent.

11. The system of claim 6, the one or more computing devices further configured to perform operations comprising:

using the determined departure time to provide flight status information in response to a received query.

12. The system of claim 6, the one or more computing devices further configured to perform operations comprising:

determining that one or more of the user computing devices have rejoined the mobile network at a location corresponding to a scheduled destination location of the flight; and determining a flight arrival time based on the time at which a first user computing device has rejoined the mobile network at the destination location.

13. A computer program product, comprising:

a non-transitory computer-readable storage medium encoded with computer-executable instructions that when executed by one or more computing devices cause the one or more computing devices to provide flight status information, the computer-executable program instructions comprising:

computer-executable program instructions to obtain flight information for each of a plurality of users, wherein each user of the plurality of users is associated with a particular flight, the flight having a flight identifier and associated with a particular scheduled departure time and departure location;

based on the scheduled departure time, computer-executable program instructions to obtain location information for user computing devices associated with each user of the plurality of users;

computer-executable program instructions to determine that the respective user computing devices associated with a first group of users of the plurality of users have a location associated with the departure location;

computer-executable program instructions to determine that at least a threshold percentage of the respective user computing devices associated with users of the group of users having a location associated with the departure location are no longer in communication with a mobile network, the threshold percentage being less than one hundred percent; and computer-executable program instructions to use the respective times at which the user computing devices are determined no longer to be in communication with the mobile network to designate a departure time for the particular flight.

14. The computer program product of claim 13, wherein the flight identifier is a flight number, the departure time comprises a particular date and time, and the departure location identifies a particular airport.

15. The computer program product of claim 13, wherein determining that a user computing device is no longer in communication with the mobile network indicates that the user computing device has been deactivated.

16. The computer program product of claim 13, wherein the threshold percentage comprises seventy-five percent.

17. The computer program product of claim 13, further comprising:

computer-executable program instructions to determine that one or more of the user computing devices have rejoined the mobile network at a location corresponding to a scheduled destination location of the flight; and computer-executable program instructions to determine a flight arrival time based on the time at which a first user computing device has rejoined the mobile network at the destination location.

18. The computer program product of claim 13, further comprising computer-executable program instructions to use the determined departure time to provide flight status information in response to a received query.

* * * * *